Patented Sept. 8, 1931

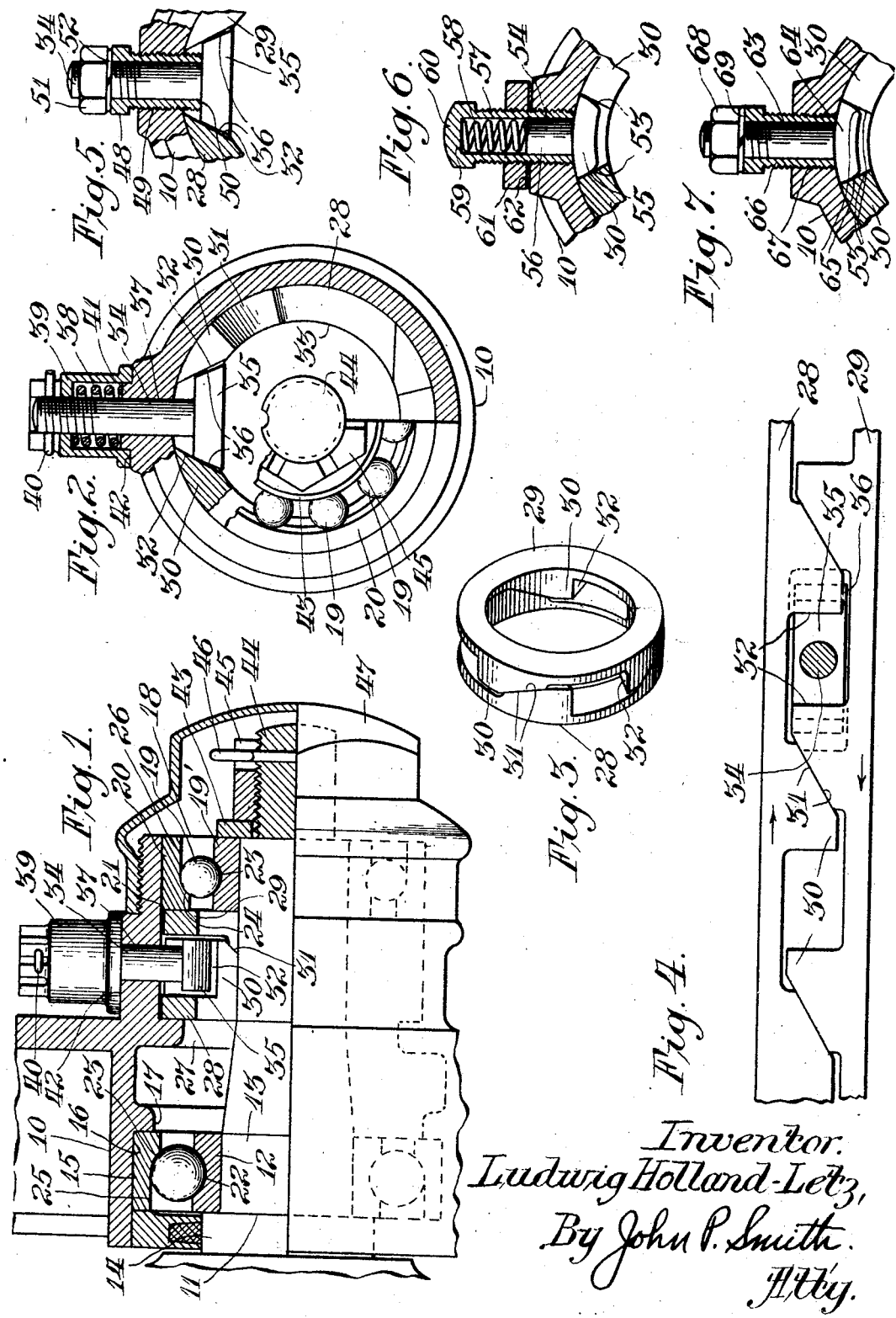

1,821,976

UNITED STATES PATENT OFFICE

LUDWIG HOLLAND-LETZ, OF CROWN POINT, INDIANA

DEVICE FOR TAKING UP THE WEAR ON ANTIFRICTION BEARINGS

Application filed October 26, 1926. Serial No. 144,292.

This invention relates to anti-friction bearings and more particularly to a device for adjusting the wearing rings or races to compensate for wear.

One of the objects of the present invention is to provide an improved automatically adjustable device for compensating for the wear on anti-friction bearings, such for instance as bearings of the roller or ball-bearing type.

A further object of the invention is to provide a novel and improved construction of adjustable wearing rings or races whereby the adjustment of the same to compensate for wear may be accomplished from the outside of the bearing, obviating the necessity of removing the bearing from its normal operative position.

A still further object of the invention is to provide an adjustable device for an anti-friction bearing in which the races of the anti-friction bearing are frictionally resisted against sudden shocks and automatically returned to their normal operative position.

A still further object of the invention is to provide an adjustable device for an anti-friction bearing in which the races of the anti-friction bearing are positively limited in their retractile movement.

A further object of the invention is to provide an adjustable device for an anti-friction bearing in which one of the races will automatically align itself to compensate for uneven wear on the race or for any disalignment of the bearing proper with respect to the shaft.

A further object of the invention is to provide an adjustable device for compensating for wear on anti-friction bearings in which the races are held in yielding position with respect to the anti-friction members.

A still further object of the invention is to provide an adjustable device for an anti-friction bearing in which the races of the anti-friction bearing may automatically adjust themselves with respect to the anti-friction members to compensate for the expansion of the shaft and bearing proper by reason of heat which usually occurs in high speed spindles or the like.

These and other objects are accomplished by providing construction in which two camming washers are actuated in opposite directions by a wedge bolt. The movement of these camming washers on each other causes them to move laterally with respect to each other and takes up the looseness occurring in the bearing.

Referring to the drawings:

Figure 1 is the conventional form of the hub of a wheel and front axle construction of a vehicle shown partly in cross-section, having my invention embodied therein;

Figure 2 is a side elevational view of the hub shown in Figure 1, with certain portions thereof shown in cross-section and with certain other portions broken away for the purpose of clearness;

Figure 3 is a detailed perspective view of the camming washers;

Figure 4 is a diagrammatic view showing the periphery of the camming washers;

Figure 5 is a modified form of the invention shown in Figures 1 and 2, in which the wedge bolt is manually adjustable from the outside of the hub as distinguished from the automatically adjustable wedge bolt shown in Figures 1 and 2;

Figure 6 is another modified form of the invention in which the wedge bolt is forced inwardly with respect to the longitudinal center of the bearing and also in which the wedge bolt is automatically actuated by a compression spring; and Figure 7 is a third modification in which the wedge bolt is manually adjustable inwardly with respect to the longitudinal center of the bearing for actuating the camming washers for taking up the wear on the bearing.

Considerable difficulty has been experienced in anti-friction bearings both of the roller and ball-bearing type, because in many instances when looseness develops by reason of wear on the rings or races, a set groove or shoulder is worn into the ring. When adjustment is made after a definite groove or shoulder is formed in the ring, the bearing ball or bearing roller, whichever the case may be, rides over a sharp edge of the groove or shoulder thus formed, causing the ball or roller to ride over an irregular or untrue path, which in some instances causes the ring or race to break by reason of the unusual strain. It is therefore one of the principal objects of my invention to provide a means which will automatically compensate or take up the wear as wear ensues on the ring and thus provide a smooth path for the bearing ball or roller during the life of the anti-friction bearing.

In illustrating one embodiment of my invention I have shown the same in connection with the hub of a vehicle in which the adjustment is made automatically or may be made manually from the outside of the hub, but it will of course be understood that the design of my invention is equally applicable to various other types of anti-friction bearings.

For the purpose of illustration I have shown my invention in connection with the conventional form of vehicle wheel which comprises the usual hub or bearing 10, which in turn is rotatably mounted on a spindle or shaft 11. The inner end of the spindle 11 is provided with an inner anti-friction bearing ring 12, which engages or snugly fits the enlarged portion 13 of the spindle and has one side thereof in contact with an enlarged flange 14 of the spindle. The outer anti-friction bearing ring 15 is mounted in the inner cylindrical recess 16 formed by the flange 17 within the hub or support 10. Mounted within the hub or support 10 adjacent the outer end thereof, is a second anti-friction bearing generally referred to by the reference character 18. This anti-friction bearing comprises an inner bearing ring or race 19 which is mounted on the spindle 11 adjacent the outer end thereof. The anti-friction bearing 18 is further provided with the usual bearing ball 19', and outer bearing ring or race 20. The outer bearing ring or race 20 is adapted to snugly fit the inner cylindrical bore 21 of the hub. Both of the anti-friction bearings shown in the drawings have their inner bearing rings 12 and 19 respectively provided with a circular raceway 22 and 23 respectively, which are located centrally with respect to each of these rings and on the outer periphery thereof. The outer rings or races 15 and 20 respectively of the anti-friction bearings shown in the drawings have a curved raceway on one side thereof as shown at 23 and 24 respectively, which in turn are tangent to cylindrical surfaces 25 and 26 respectively, and parallel to the axis of rotation of the bearing. The hub or support 10 is further provided with an inner peripheral flange as shown at 27, between which and the outer bearing ring 20 are two camming or expanding washers 28 and 29. One side of the camming washer 28 engages the flange 27 of the hub, and one side of the camming washer 29 engages the bearing ring 20. Each of these camming washers are provided with laterally projecting cam extensions 30, of which there are three in number on each of the washers, and are adapted to cooperate with each other for effecting a lateral adjustment with respect to each other. Each of these camming washers is provided with an inclined camming surface 31 so that when they are revolved in opposite directions with respect to each other in the manner hereinafter described, these washers will at the same time force each other laterally in opposite directions from each other. Each of the camming projections 30 are further provided with inclined surfaces 32 which lie in a plane tangent to an imaginary cylindrical surface which would be concentric with and have a diameter slightly smaller than the inner cylindrical aperture 33 of each of the washers 28 and 29. These camming washers 28 and 29 are identical in form and shape, but when positioned together, as shown in Figure 3, the cooperating camming surfaces 31 of the laterally extending camming projections 30 present a substantially V-shaped socket formed by the inclined surfaces 32 of the projections 30. Mounted within this V-shaped socket is an adjusting bolt 34 which is provided with a wedge-shaped head 35. The wedge-shaped head 35 is provided with bevel surfaces 36 which are slightly curved to accommodate the changing angular position of the inclined surfaces 31. These beveled surfaces 36 are adapted to engage the inclined surfaces 32 of one side of the camming projections 30 of each of the washers 28 and 29 respectively. The bolt 34 extends through an aperture 37 formed in the hub or support 10 in which it is adjustably mounted. The bolt 34 is normally or automatically actuated outwardly with respect to the longitudinal center of the bearing by means of a compression spring 38. One end of the spring 38 engages a sleeved nut 39 which is in threaded engagement with the threaded end of the bolt 34 and is secured against displacement with respect to the bolt by means of a cotter pin 40. The other end of the spring engages a circular projection 41 surrounding the aperture 37 of the hub 10, which also forms a seat as shown at 42 on which the lower end of the sleeved nut 39 is seated for completely encasing the spring.

For the above description it will be readily seen that as the bearing balls gradually wear on their respective rings or races, the compression spring 38 normally forces the bolt 34 upwardly with respect to the hub, which in turn causes the bevel surfaces 36 of the wedge-shaped head 35 to engage the inclined surfaces 32 of the cam projections 30 of the washers 28 and 29 respectively so as to force or cause these washers to rotate in opposite directions as wear ensues. At the same time this reverse rotation of each of these washers with respect to each other causes them to move laterally away from each other on account of the inclined co-acting surfaces 31 of their respective co-acting cam projections 30. In other words, as these washers are moved laterally with respect to each other, they cause the hub by reason of the washer 28 engaging the flange 27 of the hub, to move with respect to the outer ring or race 20 by reason of the washer 29 engaging the inner surface of the ring 20, thereby not only causing the wear automatically to be taken up in the outer anti-friction bearing, but also taking up the wear on the inner anti-fricton bearing, as clearly shown in Figure 1.

This construction of an automatically actuated device for taking up the wear on the anti-friction bearing as wear ensues also permits races of the anti-friction bearing to frictionally resist or retard the retractile movement of the races which may be caused by sudden shocks. The construction which performs this function includes the camming surfaces 31 of the cam projections 30 of each of the washers 28 and 29 respectively as well as the wedge bolt 35 which engage the beveled surfaces 32.

It will also be noted that the retractile movement of races of the anti-friction bearing, which may be caused by the expansion of the bearing proper or the shaft on account of excessive heat, is controlled by reason of the spring action on the wedge bolt 34, in which case the lower end of the sleeved nut 39 is partially unseated from its seat 42 on hub 10. When the lower end of the sleeved nut 39 is seated on its seat 42 of the hub and all play eliminated from the anti-friction bearings, the races are positively locked in their normal operative positions and prevented from retractile movement; at the same time any further wear on the races will be automatically taken up by the action of the spring 38 actuating the wedge bolt 34.

It will further be noted that my improved device will automatically adjust or align itself to compensate for any uneven wear on the races or for any disalignment of the bearing proper with respect to the shaft by reason of the three-co-acting laterally projecting cams 30 on each of the camming washers 28 and 29. These washers 28 and 29 are loosely mounted in the bearing proper so that they may oscillate or float so as to properly adjust or align themselves to compensate for any unever wear in the anti-friction races or any disalignment of the shaft or bearing proper with respect to each other.

The hub construction shown in the drawings is provided with the usual washer 43, which is mounted on the threaded extension 44 of the spindle 11, and horn nut 45, which in turn is prevented from displacement by the usual cotter 46. The hub is also provided with the usual cotter 46.

In the modified form shown in Figure 5, I have provided a construction in which the looseness in the anti-friction bearings, which results from wear, may be taken up manually by adjusting the threaded sleeve 48 which is mounted in the threaded aperture 49 in the hub 10. The threaded sleeve 48 is adapted to receive the bolt 34 and the lower end of the sleeve is adapted to engage one side of the wedge-shaped head 35, as shown at 50, so that when the sleeve is adjusted in the threaded bore of the hub the bolt is similarly adjusted to actuate the camming washers 28 and 29. The bolt 34, as well as the sleeve 48, is locked by means of a lock nut 51, which is in threaded engagement with the threaded end of the bolt, and locking washer 52. If it is desired to adjust the bolt 34 in this modified form, as shown in Figure 5, for taking up the wear on the anti-friction bearings, the lock nut 51 is released or loosened sufficiently to permit the adjustment of the sleeve 48, and when the desired adjustment has been attained the lock nut 51 is securely tightened so as to prevent accidental movement of the parts.

In the modified form shown in Figure 6, I have shown an automatic device in which the camming surfaces 53 of the camming projections 30 of the washers 28 and 29 respectively converge toward the center of the axis of the bearing so that the action of the wedge member 54 is actuated in a direction toward the center of the bearing in effecting a relative movement of the camming washers with respect to each other. The wedge member 54 is similarly provided with a converging V-shaped head 55 which is adapted to engage the converging or inclined surfaces 53 so that the downward movement of the wedge member 54 causes the camming washers 28 and 29 to revolve in opposite directions to effect a lateral movement of each of these members with respect to each other. The wedge member 54 is provided with a cylindrical portion 56 which is reciprocally mounted in a threaded sleeve 57. Mounted within the sleeve 57 is a compression spring 58 which has one end engaging the end of the cylindrical portion 56 of the wedge member 54, and the other end thereof seated in the socket 59 of the sleeve 57. The upper end of the sleeve 57 is provided with a wrench engaging head 60 which forms the means for adjusting the tension of the spring for varying the pressure on the wedge member in effecting the adjustment of the camming washers. The sleeve is secured against movement after it has been once set by locking nut 61 which is in threaded engagement with the sleeve and the lock washer 62.

The operation of the modified form shown in Figure 6 is substantially the same as that shown in Figure 2, except that the member 54 for automatically effecting the adjustment of the washers is actuated inwardly with respect to the center of the bearing as distinguished from the member 34 in Figure 2, which is actuated outwardly with respect to the center of the bearing for effecting the relative movement of the camming washers. In the construction shown in Figure 6, it will also be seen that by having the sleeve constructed in the manner shown in this figure, the adjustment is automatically effected and at the same time any lubrication within the bearing is prevented from being discharged through the opening in the hub. In other words, the construction shown in this figure completely encases my improved automatic adjusting device from permitting the entrance of dirt or any foreign matter into the bearing, and at the same time eliminates the possibility of the lubricant escaping.

In the modified form shown in Figure 7, I have shown the wedge member in the form of a bolt 63, which is similarly provided with a V-shaped or wedge-shaped head 64, formed by the curved converging side 65, which in turn are adapted to engage the converging or inclined surfaces 53 of the laterally projecting cam members 30 formed on the washers 28 and 29 respectively. The form shown in Figure 7 is provided with a manually adjustable means which is in the form of a threaded sleeve 66, which in turn is mounted in threaded engagement with the threaded bore 67 in the hub 10. The wedge member or bolt 63 is locked in various positions of adjustment by a locking nut 68 which is in threaded engagement with the upper threaded end of the bolt. The bolt is also provided with the usual form of lock washer 69. When it is desired to adjust the camming washers for taking up the wear on the bearing, the lock nut 68 is released sufficiently to permit the adjustment of the sleeve 66, and when the looseness in the bearing has been taken up by adjusting the wedge member 63 inwardly with respect to the center of the bearing, the lock nut is then tightened to secure the wedge member against movement.

From the above description, it will be readily seen that I have provided an improved means which is automatically actuated for normally taking up the wear on the races of the anti-friction bearing as the wear gradually ensues and thereby eliminating the necessity of testing the bearings for wear, and which under the present practice requires the removing of the hub cap and in some instances the removing of the bearings to effect a proper adjustment.

It will also be noted that with my improved device it not only enhances the life of the bearing rings or races, but at all times affords a smooth and efficient operating bearing.

The term "support" as used throughout the specification and claims is used in its broad sense so as to include bearings generally, hubs of vehicle wheels and the like, to which the invention may be applied.

While in the drawings and specification I have illustrated and described my invention in connection with the bearing for the front wheel of a vehicle, it will of course be understood that the invention is applicable to a construction of an anti-friction bearing in which the hub could be the stationary part of the bearing and the spindle could be a revolving shaft.

It is therefore within the contemplation of my invention that such modifications or reversal of parts be so included. It is also within the contemplation of my invention that anti-friction bearings of the roller type could be employed in connection with my invention, as well as the anti-friction bearings of the ball-bearing type shown in the drawings.

What I claim as my invention and desire to secure by Letters Patent is:

1. In a device of the class described, a support, a shaft, an anti-friction bearing mounted in said support, automatically actuated rotatable means carried by said support and engageable with said anti-friction bearing and means movable radially with respect to said first named means for taking up the wear on said anti-friction bearing as wear ensues.

2. In a device of the class described, a support, a shaft mounted in said support, an anti-friction bearing mounted between said support and said shaft, expanding means carried by and inside said support comprising a plurality of oppositely rotatable members, one of which being engageable with said anti-friction bearing and means engageable with said expanding means for automatically taking up the wear on said anti-friction bearing as wear ensues.

3. In a device of the class described, a support, a shaft mounted in said support, an anti-friction bearing mounted in said support, including a plurality of bearing races and anti-friction bearing members, means carried inside said support comprising an expanding unit of oppositely rotatable members, one of which being engageable with one of said bearing races, and automatically operated means extending through an aperture in said support, and engageable with said expanding unit for taking up the wear on said anti-friction bearing as wear ensues.

4. A device of the class described, a support, a shaft mounted in said support, an anti-friction bearing mounted between said support and said shaft, expanding means mounted inside said support and engageable with said anti-friction bearing and means mounted on said support and engageable with said expanding means for automatically taking up the wear on said anti-friction bearing as wear ensues.

5. In a device of the class described, a support, a shaft mounted in said support, an anti-friction bearing mounted between said shaft and said support, and expanding means carried by said support comprising a plurality of members, one of which being engageable with said anti-friction bearing, and reciprocable means engageable with said expanding means whereby said anti-friction bearing may be adjusted for taking up the wear on said anti-friction bearing as wear ensues.

6. In a device of the class described, a support, a shaft mounted in said support, an anti-friction bearing mounted between said support and said shaft, and spring actuated means carried by said support and operable from the outside of said support for varying the spring tension for taking up the wear on said anti-friction bearing as wear ensues.

7. A device for taking up the wear on an anti-friction bearing comprising a support, a shaft mounted in said support, an anti-friction bearing mounted between said support and said shaft, and spring pressed means mounted in and extending radially through said support and operable from the outside of said support for adjusting said spring pressure, said means being engageable with said anti-friction bearing whereby said means may be adjusted from the outside of said support for taking up the wear on said anti-friction bearing as wear ensues.

8. A device for taking up the wear on an anti-friction bearing comprising a support, a shaft mounted in said support, an anti-friction bearing mounted between said support and said shaft, comprising a plurality of bearing races and anti-friction bearing members, means mounted in said support and engageable with one of the races of said anti-friction bearing, and spring actuated means located externally of and extending through said support, and engageable with said first named means for taking up the wear on said anti-friction bearing as wear ensues.

9. A device for taking up the wear on an anti-friction bearing comprising a support, a shaft mounted in said support, an anti-friction bearing mounted between said support and said shaft comprising a plurality of bearing races and anti-friction members, and means including a reciprocable member carried by and extending through said support whereby one of said bearing races may be adjusted from the outside of said support for taking up the wear on said anti-friction bearing as wear ensues.

10. A device for taking up the wear on an anti-friction bearing comprising a support, a shaft mounted in said support, an anti-friction bearing mounted between said support and said shaft comprising a plurality of bearing races and anti-friction members, and means carried by and extending through said support whereby one of said bearing races may be automatically adjusted on the outside of said support for taking up the wear on said anti-friction bearing as wear ensues.

11. A device for taking up the wear on an anti-friction bearing comprising a support, a shaft mounted in said support, a plurality of spaced apart anti-friction bearing members mounted between said shaft and said support, automatic spring actuated means extending outside of said support and operatively related with one of said anti-friction bearing members within said support for taking up the wear on both of said anti-friction bearing members and means extending radially through said support for varying the spring tension of said spring actuated means.

12. A device for automatically taking up the wear on an anti-friction bearing comprising a support, a shaft mounted in said support, a plurality of spaced apart anti-friction bearing members mounted between said shaft and said support, a plurality of rotatable camming members, one of which being engageable with one of said anti-friction bearing members, and spring actuated reciprocable means mounted externally of said support and engageable with one of said camming members for automatically taking up the wear on both of said anti-friction bearing members as wear ensues.

13. A device for taking up the wear on an anti-friction bearing comprising a support, a shaft mounted in said support, an anti-friction bearing mounted between said shaft and said support, comprising a plurality of bearing races and anti-friction bearing members, a plurality of movable camming members mounted in said support and having one thereof, engageable with one of said races, an automatically spring actuated reciprocable means mounted in said support and engageable with said camming members for automatically taking up the wear on said anti-friction bearing as wear ensues.

14. A device for taking up the wear on an anti-friction bearing comprising a support, a shaft mounted in said support, an anti-friction bearing mounted between said shaft and said support, and means including a plurality of oppositely actuated members mounted in said support and engageable with said anti-friction bearing for taking up the wear on said anti-friction bearing.

15. A device for taking up the wear on an anti-friction bearing comprising a support, a shaft mounted in said support, an anti-friction bearing mounted between said shaft and said support, and means including a plurality of oppositely movable and adjustably controlled members mounted in said support and engageable with said anti-friction bearing for taking up the wear on said anti-friction bearing.

16. A device for taking up the wear on an anti-friction bearing comprising a support, a shaft mounted in said bearing, an anti-friction bearing mounted between said shaft and said support, and means including a plurality of oppositely movable and automatically controlled members mounted in said support and engageable with said anti-friction bearing for taking up the wear on said anti-friction bearing as wear ensues.

17. A device for taking up the wear on an anti-friction bearing comprising a support, a shaft mounted in said support, anti-friction bearing member mounted between said support and said shaft, including a plurality of bearing races and anti-friction bearing members, and means including a plurality of oppositely rotatable members mounted in said support and engageable with one of the races of said anti-friction bearing for taking up the wear on said anti-friction bearing.

18. A device for taking up the wear on an anti-friction bearing comprising a support, a shaft mounted in said bearing, an anti-friction bearing member mounted between said support and said shaft, including a plurality of bearing races anti-friction bearing members, a plurality of oppositely movable members mounted in said support and engageable with one of said bearing races, and means mounted in and extending through said support and engageable with one of said movable members for taking up the wear on said anti-friction bearing.

19. A device for taking up the wear on an anti-friction bearing comprising a support, a shaft mounted in said bearing, an anti-friction bearing member mounted between said support and said shaft, including a plurality of bearing races and anti-friction bearing members, a plurality of movable members mounted in said support and engageable with one of said bearing races, and automatically actuated means mounted in and extending through said support and engageable with said movable members for taking up the wear on said anti-friction bearing as wear ensues.

20. A device for taking up the wear on an anti-friction bearing comprising a support, a shaft mounted in said bearing, an anti-friction bearing mounted between said support and said shaft, including a plurality of bearing races and anti-friction members, a plurality of rotatable camming washers mounted in said support and engageable with one of said bearing races, and reciprocable means mounted in said support and engageable with said camming washers for taking up the wear on said anti-friction bearing.

21. A device for taking up the wear on an anti-friction bearing comprising a support, a shaft mounted in said bearing, an anti-friction bearing mounted between said support and said shaft, including a plurality of bearing races and anti-friction members, a plurality of rotatable camming washers mounted in said support and engageable with one of said bearing races, and automatically actuated means mounted in said support and engageable with said camming washers for taking up the wear on said anti-friction bearing.

22. A device for taking up the wear on anti-friction bearings comprising a support, a shaft mounted in said bearing, an anti-friction bearing mounted between said support and said shaft, including a plurality of bearing races, anti-friction bearing members mounted between said races, a plurality of co-acting camming washers mounted in said support and adapted to be moved in opposite directions to each other, and means mounted in said support and engageable with said washers for actuating said washers in a direction to move them with respect to each other for taking up the wear on said anti-friction bearing.

23. A device for taking up the wear on an anti-friction bearing, comprising a support, a shaft mounted in said bearing, an anti-friction bearing mounted between said support and said shaft, including a plurality of bearing races, a plurality of anti-friction bearing members mounted in bearing races, a plurality of movable washers mounted in said support, having co-acting cam engaging projections, one of said washers engageable with one of said bearing races, and a movable wedge member mounted in said support and engageable with said washers for actuating said washers for taking up the wear on said anti-friction bearing.

24. A device for taking up the wear on an anti-friction bearing, comprising a support, a shaft mounted in said bearing, an anti-friction bearing mounted between said support and said shaft, including a plurality of bearing races, a plurality of anti-friction bearing members mounted in the bearing races, a plurality of movable washers mounted in said support, having co-acting cam engaging projections, one of said washers engageable with one of said bearing races, and an automatically movable wedge member mounted in said support and engageable with said washers for actuating said washers for taking up the wear on said anti-friction bearing as wear ensues.

25. A device for taking up the wear on an anti-friction bearing comprising a support, a shaft mounted in said bearing, an anti-friction bearing mounted between said support and said shaft, and means mounted in said support including oppositely rotatable camming washers, one of which being engageable with said anti-friction bearing and a spring actuated wedge member engageable with said washers for automatically taking up the wear on said anti-friction bearing, said means permitting a retractile movement of said anti-friction bearing to compensate the expansion of said shaft.

26. A device for taking up the wear on an anti-friction bearing comprising a support, a shaft mounted in said bearing, an anti-friction bearing mounted between said support and said shaft, means mounted in said support including oppositely rotatable camming washers, one of which being engageable with said anti-friction bearing, said camming washers having a V shaped recess formed therebetween, and a wedge member mounted in said V shaped recess for automatically taking up the wear on said anti-friction bearing, said means permitting a retractile movement of said anti-friction bearing to compensate the expansion of said bearing.

27. A device for taking up the wear on an anti-friction bearing comprising a support, a shaft mounted in said bearing, an anti-friction bearing mounted between said support and said shaft, a plurality of rotatable camming washers carried by said support and engageable with said anti-friction bearing, said camming washers having a recess therebetween, and a spring actuated member mounted in said recess for taking up the wear on said anti-friction bearing and for permitting a yielding retractile movement of said anti-friction bearing.

28. A device for taking up the wear on an anti-friction bearing comprising a support, a shaft mounted in said support, an anti-friction bearing mounted between said support and said shaft, a pair of oppositely rotatable camming members mounted in said support and having one thereof engageable with said anti-friction bearing, a radially movable member mounted in said support and engageable with said camming members for rotating the same and a spring mounted externally of said first named support and adjustably connected with said radially movable member for taking up the wear on said anti-friction bearing and for automatically adjusting said anti-friction bearing for compensating for uneven wear on said anti-friction bearing.

29. A device of the class described comprising a support, a shaft mounted in said support, anti-friction bearing mounted between said support and said shaft, expanding means mounted in said support and engageable with said anti-friction bearing, and means mounted externally of said support, and extending through an aperture therein, and engageable with said expanding means for taking up the wear on said anti-friction bearing as wear ensues.

30. A device of the class described, comprising a support, a shaft mounted in said support, bearings mounted between said shaft and said support, a spreading unit mounted inside said support for varying the axial distance between said bearings, and a reciprocable member extending through an aperture in said support and engageable with said spreading unit for taking up the wear on said bearings as wear ensues.

31. A device of the class described comprising a support, a shaft mounted in said support, bearings mounted between said shaft and said support, means mounted in said support embracing said shaft and engageable with said bearing, and an adjustable member extending through an aperture in said support, and located at right angles with respect to the axis of said shaft, said adjustable member being engageable with said first named means for taking up the wear on said bearing as wear ensues.

In testimony whereof I have signed my name to this specification, on this 22d day of October A. D. 1926.

LUDWIG HOLLAND-LETZ.

CERTIFICATE OF CORRECTION.

Patent No. 1,821,976. Granted September 8, 1931, to

LUDWIG HOLLAND-LETZ.

It is hereby certified that error appears in the printed specification of the above numbered patent requiring correction as follows: Page 2, line 120, for the word "For" read From; page 6, line 8, claim 16, lines 29, 42, 56, 68, 81, 96, 111 and 127, claims 18 to 25, and page 7, lines 11 and 26, claims 26 and 27, respectively, for the word "bearing" read support; and that the said Letters Patent should be read with these corrections therein that the same may conform to the record of the case in the Patent Office.

Signed and sealed this 3rd day of November, A. D. 1931.

(Seal)

M. J. Moore,
Acting Commissioner of Patents.